United States Patent
Li et al.

(10) Patent No.: US 12,228,693 B2
(45) Date of Patent: Feb. 18, 2025

(54) SEISMIC DENOISING

(71) Applicant: Shearwater GeoServices Software Inc., Houston, TX (US)

(72) Inventors: Chengbo Li, Houston, TX (US); Yu Zhang, Katy, TX (US)

(73) Assignee: Shearwater GeoServices Software Inc., Houston, TX (US)

( * ) Notice: Subject to any disclaimer, the term of this patent is extended or adjusted under 35 U.S.C. 154(b) by 443 days.

(21) Appl. No.: 17/587,765

(22) Filed: Jan. 28, 2022

(65) Prior Publication Data

US 2022/0236436 A1  Jul. 28, 2022

Related U.S. Application Data

(60) Provisional application No. 63/142,626, filed on Jan. 28, 2021.

(51) Int. Cl.
*G01V 1/36* (2006.01)

(52) U.S. Cl.
CPC .............. *G01V 1/368* (2013.01); *G01V 1/362* (2013.01); *G01V 2210/1234* (2013.01); *G01V 2210/3246* (2013.01); *G01V 2210/3248* (2013.01); *G01V 2210/51* (2013.01)

(58) Field of Classification Search
CPC .................. G01V 1/362; G01V 1/368; G01V 2210/1234; G01V 2210/3246; G01V 2210/3248; G01V 2210/51
See application file for complete search history.

(56) References Cited

U.S. PATENT DOCUMENTS

| | | | |
|---|---|---|---|
| 7,936,640 B2 * | 5/2011 | Robinson | G01V 1/364 367/38 |
| 10,324,211 B2 * | 6/2019 | Aarre | G01V 1/364 |
| 11,009,619 B2 * | 5/2021 | Paffenholz | G01V 1/32 |

* cited by examiner

*Primary Examiner* — Elias Desta
(74) *Attorney, Agent, or Firm* — Polsinelli PC

(57) ABSTRACT

Leveraging migration and demigration, here we propose a learning-based approach for fast denoising with applications to fast-track processing. The method is designed to directly work on raw data without separating each noise type and character. The automatic attenuation of noise is attained by performing migration/demigration guided sparse inversion. By discussing examples from a Permian Basin dataset with very challenging noise issues, we attest the feasibility of this learning-based approach as a fast turnaround alternative to conventional denoising methodology.

24 Claims, 2 Drawing Sheets

SEISMIC DENOISING

CROSS-REFERENCE TO RELATED APPLICATIONS

This application is a non-provisional application which claims benefit under 35 USC § 119(e) to U.S. Provisional Application Ser. No. 63/142,626 filed Jan. 28, 2021, entitled "SEISMIC DENOISING," which is incorporated herein in its entirety.

STATEMENT REGARDING FEDERALLY SPONSORED RESEARCH

None.

FIELD OF THE INVENTION

The present invention relates generally to a learning-based approach for fast denoising with applications to fast-track processing. The method is designed to directly work on raw data without separating each noise type and character. The automatic attenuation of noise is attained by performing migration/demigration guided sparse inversion.

BACKGROUND OF THE INVENTION

Seismic provides unique insights for exploration and development. Improving signal-to-noise ratio is vital in seismic processing to meet the needs of geophysical applications. In general, noise attenuation is performed in many steps of processing, aiming various data domains and methods for iterative reduction. Conventional denoising methods often targeted a single type of noise such as harmonics or ice-break noise (e.g., Li et al., 1995; Gulunay, 2014), or noise with similar characters such as random noise or guided waves (e.g., Soubaras, 1995; Spitzer et al., 2001). A typical workflow in processing starts with identifying dominant noise types and then based on the experience, cascades a series of filtering and inversion tools for attenuation. Depending on the strength and complexity of noise, such a process could require extensive testing in multiple data domains and interaction with other processing sequences, possibly adding weeks or even months of time. A practical fast denoising solution is indeed imperative for fast-track processing with compressed timeline.

In recent times, machine learning has gained increasing popularity in geophysics. It offers a new perspective on seismic data processing. Taking denoising problems for example, one can train a filter or an optimizer to adapt to the local wavefield morphology and obtain clean signal estimates (e.g., Beckouche and Ma, 2014; Mandelli et al., 2019). These methods rely on the learning ability to suppress noise. Li et al. (2018, 2019) introduced a weak signal recovery technique which integrated the conventional denoising methods with dictionary learning and inversion. The versatility was illustrated through examples of attenuating both incoherent and coherent noises on land. We here further expand the technique to develop a fast denoising approach using migration and demigration. The premise is that migration could focus the seismic signal into coherent events, and meanwhile, defocus the noise. Given sufficient fold, the stacking power shall further increase the signal-to-noise ratio. Demigrated gathers from the stacked image then serve as a training set to guide noise removal from raw data. The approach is intended to substitute manual and iterative process with algorithmic computation, reducing time and effort associated with designing complex noise attenuation workflow. We discuss examples from Permian Basin to show the impacts on fast-track and production processing.

Noise is an unavoidable issue in seismic acquisition and processing. In particular with modern land acquisition design trending towards point source, point sensor and high trace density, the raw seismic quality would be further compromised due to the lack of stacking power for individual traces. For decades, many authors have put forward their solutions to cope with noise. Nevertheless, these methods often targeted a single type of noise, such as harmonics or ice-break noise, or noise with similar characters, such as random noise or guided waves. In processing, seismic denoising is often performed in data domains and incorporated into multiple steps to account for different noise characters. Even though most denoising methods are less computationally intensive comparing to velocity model building and imaging, the procedure could be still time consuming with iterations of manual testing, quality control and parameterization.

BRIEF SUMMARY OF THE DISCLOSURE

Leveraging migration and demigration, here we propose a learning-based approach for fast denoising with applications to fast-track processing. The method is designed to directly work on raw data without separating each noise type and character. The automatic attenuation of noise is attained by performing migration/demigration guided sparse inversion. By discussing examples from a Permian Basin dataset with very challenging noise issues, we attest the feasibility of this learning-based approach as a fast turnaround alternative to conventional denoising methodology.

The invention more particularly includes a process for automatically suppressing noise in raw seismic data (d) by estimating the reference image ($\hat{m}$) using a seismic image processing technique selected from automatic gain control, migration and stacking, or other imaging techniques; demigrating the data from the reference image ($\hat{m}$) and building a dictionary from the demigrated data by unsupervised learning; solving a dual-domain sparse inversion problem to simultaneously invert signal and noise and obtain a denoised copy of the raw input data (d).

A process for imaging a subterranean reservoir under a survey area; designing a seismic survey to image the subterranean formations; acquiring raw data using seismic sources and receivers; obtaining raw data (d) from a seismic survey; estimating the stacked image ($\hat{m}$); demigrating the data from the stacked image ($\hat{m}$) to attain a clean reference; building a reference from the demigrated data; solving an unsupervised dictionary learning problem; resolving a dual-domain sparse inversion to leverage sparsity and guide attenuating noise of the raw input data (d); inverting simultaneously the dual-domain sparse inversion to achieve a successful reduction or more and stronger noise; and comparing a direct demigration to the learned inversion to obtain denoised data with a proper amplitude versus offset.

A process for producing hydrocarbons from a subterranean reservoir selecting a subterranean formation for hydrocarbon production; designing a seismic survey to image the subterranean formation; acquiring raw data using seismic sources and receivers; obtaining raw data (d) from a seismic survey; estimating the stacked image ($\hat{m}$) with mitigated artifacts; demigrating the data from the stacked image ($\hat{m}$) to attain a clean reference; building a reference from the demigrated data; solving an unsupervised dictionary learning problem; resolving a dual-domain sparse inversion to leverage sparsity and guide attenuating noise of the raw input data (d); inverting simultaneously the dual-domain sparse inversion to reduce noise; comparing a direct demigration to the learned inversion to obtain denoised data with a proper amplitude versus offset; and constructing a well in said subterranean reservoir to produce hydrocarbons.

In some embodiments the subterranean reservoir is an oil reservoir, an unconventional reservoir, heavy oil reservoir, gas reservoir, coal-bed-methane reservoir, or a source rock.

Seismic data noise may include many different kinds coherent and incoherent noise from harmonics, random noise, guided waves, and combinations thereof.

The stacked image may be estimated by $$\tilde{m}=L^T Wd,$$

where $L^T$ denotes the migration operator and W applies a filter.

Mitigated artifacts may be filtered with an automatic gain control (AGC) and other noise control techniques.

The denoised data may be demigrated from the image estimate ($\tilde{m}$) with the velocity model $$\tilde{d}=L\tilde{m}=LL^T Wd,$$

where $\tilde{d}$ share the same source/receiver locations, kinematics and spectrums as input data d, but with less noise.

The unsupervised dictionary learning problem may be $$\min_{Dx}\|\tilde{d} - Dx\|^2 \text{ s.t. } \|x\|_0 \le T.$$

where the dictionary D and sparse coefficients x are resulted by a sparse linear decomposition of the demigrated data $\tilde{d}$, and T is the sparsity threshold.

The trained dictionary (D) problem is used to guide attenuating noise on the raw input data (d):

$$\min_{x_1,x_2}\|x_1\|_1 - \alpha\|x_2\|_1 \text{ s.t. } \|d - Dx_1 - Sx_2\|^2 \le \epsilon,$$

where $x_1$ and $x_2$ are the sparse representations of signal and noise, respectively, S is the sparsity basis for noise, and a and E are the tradeoff parameter and error tolerance.

As used herein, equations include the equation as written, rearranged, or substituted with equivalent variables such that $\tilde{m}=L^T Wd$ is equivalent to $L^T=\tilde{m}(Wd)^{-1}$ is equivalent to $Wd=\tilde{m}/L^T$. Other equations may be similarly manipulated to solve for different variables or substitute equivalent terms.

BRIEF DESCRIPTION OF THE DRAWINGS

A more complete understanding of the present invention and benefits thereof may be acquired by referring to the follow description taken in conjunction with the accompanying drawings.

DETAILED DESCRIPTION

Figure 1:
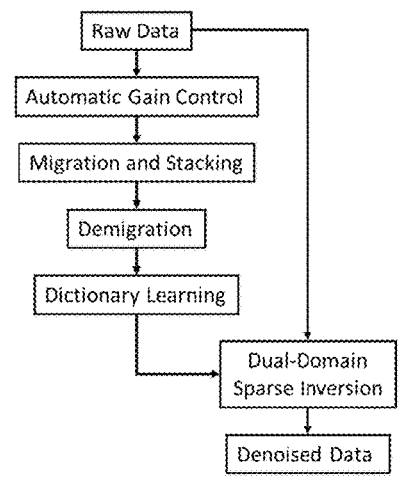
FIG. 1 outlines the proposed workflow for fast denoising.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Pre-stack migration and stacking is a natural means to suppress noise in data. Given noisy data i, one can quickly estimate the stacked image $\tilde{m}$ by $$\tilde{m}=L^T Wd,$$

where $L^T$ denotes the migration operator and w applies automatic gain control (AGC) to the input data. The goal of AGC is to mitigate artifacts from large-amplitude noise during migration. Though it could be substituted by other filtering methods, AGC is deemed to be appropriate due to its simple parameterization and robustness.

Demigration can be regarded as the adjoint operator of migration, which has been widely used to implement least-squares migration (Schuster, 1993). To attain a clean reference, we demigrate the data from the image estimate with the same velocity model, i.e., $$\tilde{d}=L\tilde{m}=LL^T Wd,$$

With careful implementation, we ensure the demigrated data $\tilde{d}$ share the same source/receiver locations, kinematics and spectrums as input data d, but with little noise. Since demigration is performed on the stacked image with AGC applied, $\tilde{d}$ cannot maintain the true amplitude and correct amplitude versus offset (AVO) response, both of which are critical for subsequent quantitative analysis. In order to preserve the amplitude of primaries in denoising, we propose to build a reference from the demigrated data and then count on learning and inversion to recover the signal.

We exploit the spatial and temporal redundancies in the demigrated data by solving an unsupervised dictionary learning problem, i.e., $$\min_{Dx}\|\tilde{d} - Dx\|^2 \text{ s.t. } \|x\|_0 \le T.$$

Here the dictionary D and sparse coefficients x are resulted by a sparse linear decomposition of the demigrated data $\tilde{d}$, and T is the sparsity threshold. The premise of sparsity holds in general since seismic data are, by nature, five-dimensional measurements of three-dimensional subsurface.

The trained dictionary D is next used to guide attenuating noise on the raw input d. Specifically, we aim to resolve a dual-domain sparse inversion problem which leverages the sparsity again and simultaneously inverts for target signal and noise. That is to solve $$\min_{x_1, x_2} \|x_1\|_1 - \alpha \|x_2\|_1 \text{ s.t. } \|d - Dx_1 - Sx_2\|^2 \leq \epsilon,$$

where $x_1$ and $x_2$ are the sparse representations of signal and noise, respectively, S is the sparsity basis for noise, and a and E are the tradeoff parameter and error tolerance. Note that S can be defined using either non-adaptive transforms or a similar learning model to train from noise. By inverting simultaneously, we lift the problem into a higher dimension which permits a successful reduction with much stronger noise. Solving both optimization problems are non-trivial but omitted here due to limited space (Aharon et al., 2006; Li et al., 2013). The denoised data from d is given by $$d_{out} = Dx_1,$$

Comparing to a direct demigration, the result of learning and inversion adapts to the true amplitude of signal, giving rise to proper AVO responses. The workflow of the proposed approach is summarized in FIG. 1. Next, we will describe a case study from a Permian Basin dataset to show its potential for fast-tack processing.

The following examples of certain embodiments of the invention are given. Each example is provided by way of explanation of the invention, one of many embodiments of the invention, and the following examples should not be read to limit, or define, the scope of the invention.

Example 1: A Case Study from Permian Basin

In 2018, we conducted a high-density acquisition over a producing field in the Permian Basin, in an effort to increase image quality for unconventional reservoir development. The survey was acquired using point source, point receiver in conjunction with CSI technology (Mosher et al., 2017) to maximize the operation efficiency. The field is known as a difficult seismic data area—salt dissolution in near surfaces causes strong back-scattering noise. In addition, increased amount of surface activities further deteriorates the noise issue.

Figure 2:
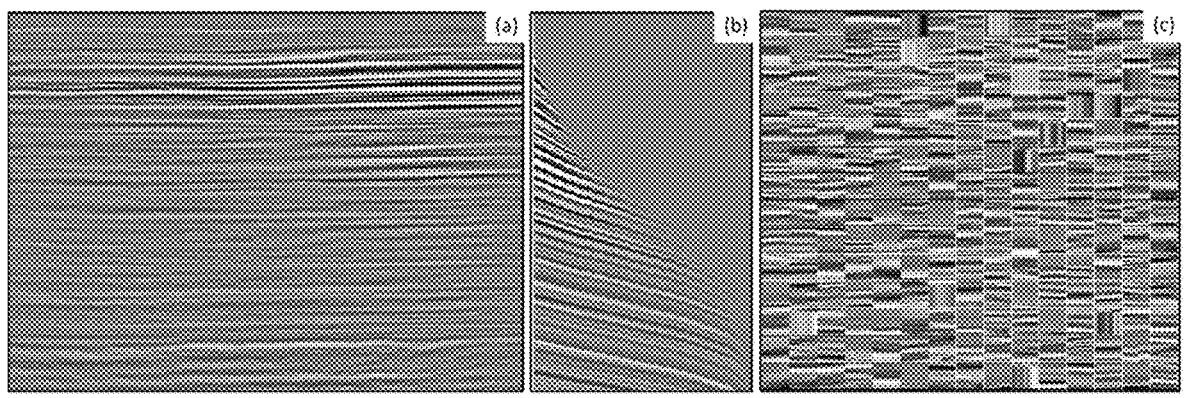
FIG. 2a is an inline stack after AGC and migration from the raw data.
FIG. 2b is a demigrated CDP gather from the stacked image.
FIG. 2c is a subset of the trained dictionary with moveout correction.

In parallel with production processing using conventional denoising means and cascaded workflow, we ran a test using the above approach. The raw data after applying AGC were directly migrated using Kirchhoff prestack depth migration with a reasonably good velocity model. Then Kirchhoff demigration (Zhang et al., 2002) was employed to build the reference model in the time domain. FIG. 2a shows an inline stack after AGC and migration, while FIG. 2b shows a demigrated CDP gather from the stacked image. It is worth noting that the demigrated data were noise-free but only reflected the kinematics with constant AVO response. Nevertheless, they served as the training set for patched-based dictionary learning. FIG. 2c displays a subset of the trained dictionary with moveout correction, revealing the dominant signal characters captured by learning. A dual-domain sparse inversion was next executed to automatically invert a denoised estimate from the raw data.

Figure 3:
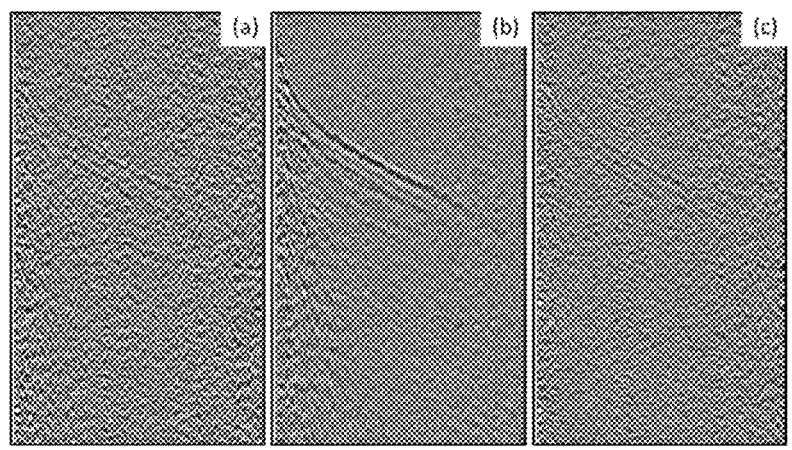
FIG. 3a shows a raw CDP gather.
FIG. 3b shows the same gather after learning-based fast denoising.
FIG. 3c shows the same gather after conventional cascaded denoising.
Figure 4:
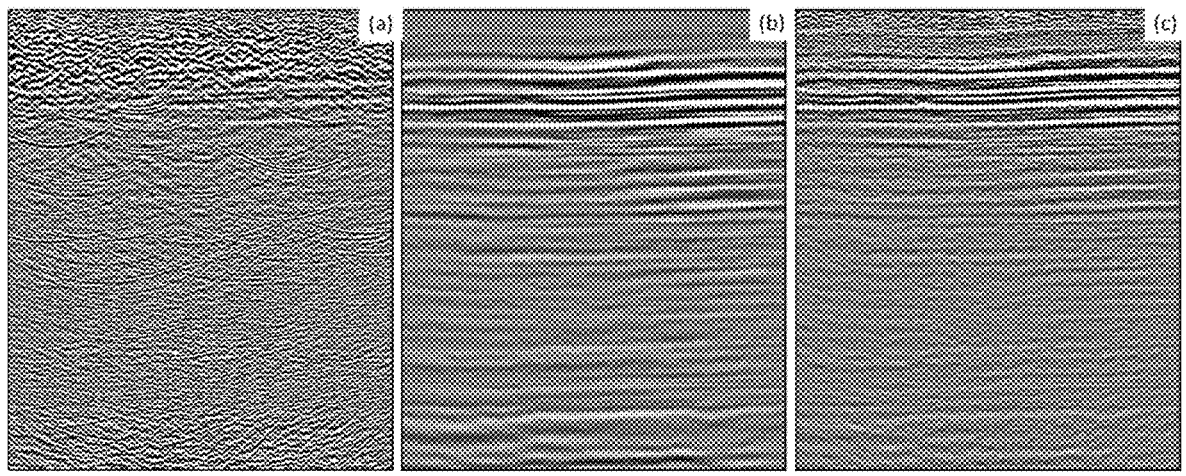
FIG. 4a demonstrates a migrated stack (0-20,000 ft) from the raw data.
FIG. 4b shows the same migrated stack from the data after learning-based fast denoising.
FIG. 4c shows the same migrated stack from the fast-track data after conventional cascaded denoising.

We compared the result to the one obtained from production fast-track processing at a similar stage. The production denoising workflow is composed of several cascaded steps, mainly targeting narrow-band noise bursts, spikes, ground roll and scattering noise. Because of the high complexity of the noise in the area, establishing such a workflow using conventional methods involved iterations of manual testing. In the end, we spent about 5 weeks to clean up the data to a quality that met the requirements of fast-track processing. On the other hand, thanks to the data-driven nature of the proposed approach, the fast denoising was completed in 5 days with minimal manual efforts. FIG. 4 compares the quality of data before and after noise attenuation in the CDP domain. Specifically, FIG. 3a shows a raw CDP gather, whereas FIGS. 3b and 3c show the same gathers after learning-based fast denoising and conventional cascaded denoising. While both results provided over 30 dB improvement on signal-to-noise ratio, the learning-based approach was obviously advantageous in light of its ability to automatically reduce noise over all time and offsets.

We further examined the data by imaging. We ran Kirchhoff prestack depth migration on all three datasets shown in FIG. 3. To warrant a fair comparison, the same surface-consistent solutions were applied prior to migration. FIG. 4a displays an inline migrated stack from the raw data. Despite the high trace density, the image still exhibits strong migration artifacts resulted from very low signal-to-noise ratio. FIGS. 4b and 4c show the same inline from volumes denoised by learning-based approach and conventional workflow used in fast-track processing. Both images from the data after denoising suggest a clear uplift in imaging quality and interpretability. Events below salt dissolution zone are much better defined. Furthermore, FIG. 4b exhibits improved continuities and less crossing artifacts on the image in contrary to FIG. 4c, which advocates for the effectiveness of the proposed method. In summary, the learning-based fast denoising approach was capable of reaching a similar quality, if not better, as conventional cascaded workflow, but with only a fraction of budged time. Little testing and tuning required also made this approach attractive for fast-track processing.

Example 2: Extended Application to Post-Migration Processing

Besides the usage of fast denoising, the proposed approach can also be adapted to clean up gathers at various stages of production processing. For instance, by means of omitting AGC and inserting a remigration step after demigration in the workflow shown in FIG. 1, we could build an automatic procedure for post-migration gather cleaning. It takes advantages of demigration and remigration to generate a reference, which serves as a guidance for noise removal.

Figure 5:
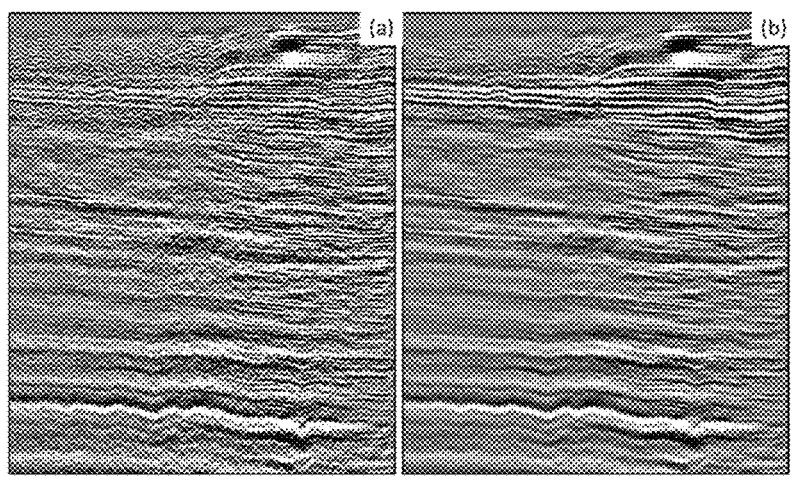
FIG. 5a is a migrated common offset gather from production processing.
FIG. 5b shows the same common offset gather after learning-based gather cleaning.

FIG. 5a shows an example of common offset image after production pre-processing and Kirchhoff migration. Despite the fact of single-fold data, events were well focused with some noticeable crosshatch noise. FIG. 5b shows the same common offset image after applying the learning-based denoising approach described above. It is observed that crosshatch noise has been greatly reduced without damaging the primaries. The amplitude of each offset gather has also been preserved through the process, which warrant proper AVO responses.

Traditionally, it has been a time consuming and manually intensive task to come up with an effective denoising workflow for the areas affected by strong complex noise. Leveraging migration and demigration, we put forward a fast denoising approach which turns noise attenuation problem into learning and inversion. It is applicable to a direct attenuation of various noises in the raw data with a unified approach and little tuning. Examples from Permian Basin proved that it could achieve similar or higher quality comparing to conventional methodologies commonly used in seismic processing, with a reduced timeline from weeks to days. This approach can also be adapted to clean up gathers before or after migration to facilitate production processing.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 8,538,702, Geologic features from curvelet based seismic attributes.
2. U.S. Pat. No. 9,607,362, Compressive imaging using approximate message passing with denoising.
3. U.S. Pat. No. 10,387,765, Image correction using a deep generative machine-learning model.
4. U.S. Pat. No. 10,436,924, Denoising seismic data.
5. US 20100186950, Geologic features from curvelet based seismic attributes.
6. US20110115787, Visulation of Geologic Features Using Data Representations Thereof.
7. US20160048950, Compressive imaging using approximate message passing with denoising.
8. US20170108604, Denoising seismic data.
9. US20170372193, Image correction using a deep generative machine-learning model.
10. US20180267188, Methods and Systems to Interpolate Seismic Data.
11. US20190170888, Systems and Methods for Refining Estimated Parameter Values in Seismic Imaging.
12. US20190383965, Geophysical Deep Learning.
13. US20200018149, Systems and Methods for Detecting a Subsurface Event.
14. US20200064507, Fault Detection Based on Seismic Data Interpretation.
15. US20200104745, Machine Learning Based Signal Recovery.
16. Li, X.-P., W. Sollner, and P. Hubral, 1995, Elimination of harmonic distortion in vibroseis data: Geophysics, 60, 503-516.
17. Gulunay, N., 2014, Ice break attenuation on Alaska data with V1 noise attenuation (V1NAT) method: SEG Expanded Abstmcts.
18. Soubaras, R., 1995, Prestack random and impulsive noise attenuation by f-x projection fitering: SEG Expanded Abstracts.
19. Spitzer, R., F. O. Nitsche, and A. G. Green, 2001, Reducing source-generated noise in shallow seismic data using linear and hyperbolic τ-p transformations: Geophysics, 66, 1612-1621.
20. Beckouche, S., and J. Ma, 2014, Simultaneous dictionary learning and denoising for seismic data: Geophysics, 79, 27-31.
21. Mandelli, S., V. Lipari, P. Bestagini, and S. Tubaro, 2019, Interpolation and denoising of seismic data using convolutional neural networks: arXiv, 1901.07927.
22. Li, C., Y. Zhang, and C. C. Mosher, 2018, An unsupervised learning method for residual seismic signal recovery: SEG Expanded Abstracts, 1996-2000.
23. Li, C., Y. Zhang, and C. Mosher, 2019, A hybrid learning-based framework for seismic denoising: The Leading Edge, 38, no. 7, 542-549.
24. Li, C., Y. Zhang, C. C. Mosher, and H. Chen, 2019, Coherent noise attenuation using machine learning techniques for land seismic processing; SEG International Exposition and Annual Meeting, Sep. 15-20, 2019
25. Schuster, G. T., 1993, Least-squares cross-well migration: SEG Expanded Abstracts.
26. Aharon, M., M. Elad, and A. M. Bruckstein, 2006, K-SVD: An algorithm for designing of overcomplete dictionaries for sparse representation: IEEE Trans. Signal Process., 54, 4311-4322.
27. Li, C., W. Yin, H. Jiang, and Y. Zhang, 2013, An efficient augmented Lagrangian method with applications to total variation minimization: Comput. Optim. Appl., 56, 507-530.
28. Mosher, C. C., C. Li, F. D. Janiszewski, L. S. Williams, T. C. Carey, and Y. Ji, 2017, Operational deployment of compressive sensing systems for seismic data acquisition: The Leading Edge, 36, 661-669.
29. Zhang, Y., M. Karazincir, C. Notfors, J. Sun, and B. Hung, 2002, Amplitude preserving v(z) pre-stack Kirchhoff migration, demigration and modeling: EAGE Expanded Abstracts.

The invention claimed is:
1. A process for automatically suppressing noise in seismic data where the process comprises:
    obtaining raw data (d) from a seismic survey;
    estimating a reference image ($\hat{m}$) using a seismic image processing technique selected from automatic gain control, migration and stacking;
    demigrating the data from the reference image ($\hat{m}$) and building a dictionary from the demigrated data by unsupervised learning;
    solving a dual-domain inversion problem to simultaneously invert signal and noise to obtain a denoised copy of the raw data (d).
2. The process of claim 1, wherein a subterranean reservoir is selected from an oil reservoir, an unconventional reservoir, heavy oil reservoir, gas reservoir, coal-bed-methane reservoir, or a source rock.
3. The process of claim 1, wherein said data has noise selected from harmonics, random noise, guided waves, coherent, and incoherent noise and combinations thereof.
4. The process of claim 1, wherein said stacked image is estimated by

$$\hat{m} = L^T W d,$$

where $L^T$ denotes a migration operator and W applies a filter.
5. The process of claim 1, wherein mitigated artifacts are filtered with an automatic gain control (AGC).

6. The process of claim 1, wherein denoised data is demigrated from the image estimate (m) with a velocity model $$\tilde{d}=L\tilde{m}=LL^TWd,$$

where $\tilde{d}$ share source/receiver locations, kinematics and spectrums as input data d, but with less noise.

7. The process of claim 1, wherein an unsupervised dictionary learning model is:

$$\min_{D,x}\left\|\tilde{d}-Dx\right\|^2 \text{ s.t. } \|x\|_0 \leq T,$$

where dictionary D and sparse coefficients x are resulted by a sparse linear decomposition of demigrated data $\tilde{d}$, and T is a sparsity threshold.

8. The process of claim 7, wherein the dictionary (D) is used to guide attenuating noise on the raw data (d):

$$\min_{x_1,x_2}\|x_1\|_1 + \alpha\|x_2\|_1 \text{ s.t. } \|d-Dx_1-Sx_2\|^2 \leq \epsilon,$$

where $x_1$ and $x_2$ are the sparse representations of signal and noise, respectively, S is a sparsity basis for noise, $\alpha$ is a tradeoff parameter, and $\epsilon$ is an error tolerance.

9. A process for imaging a subterranean reservoir comprising:
selecting a survey area;
designing a seismic survey to image a subterranean formations;
acquiring raw data using seismic sources and receivers;
obtaining raw data (d) from the seismic survey;
estimating a stacked image ($\tilde{m}$);
demigrating the data from the stacked image ($\tilde{m}$) to attain a clean reference;
building a dictionary from the demigrated data comprising;
solving an unsupervised dictionary learning problem;
solving a dual-domain inversion to leverage sparsity, compressibility or both to guide attenuating noise of the raw data (d);
simultaneously inverting signal and noise to provide an improved signal wherein said improved signal has automatic noise reduction with amplitude preservation.

10. The process of claim 9, wherein said subterranean reservoir is selected from an oil reservoir, an unconventional reservoir, heavy oil reservoir, gas reservoir, coal-bed-methane reservoir, or a source rock.

11. The process of claim 9, wherein said data has noise selected from harmonics, random noise, guided waves, coherent, and incoherent noise and combinations thereof.

12. The process of claim 9, wherein said stacked image is estimated by $$\tilde{m}=L^TWd,$$

where $L^T$ denotes a migration operator and W applies a filter.

13. The process of claim 9, wherein mitigated artifacts are filtered with an automatic gain control (AGC).

14. The process of claim 9, wherein denoised data is demigrated from the image estimate ($\tilde{m}$) with a velocity model $$\tilde{d}=L\tilde{m}=LL^TWd,$$

where $\tilde{d}$ share source/receiver locations, kinematics and spectrums as input data d, but with less noise.

15. The process of claim 9, wherein an unsupervised dictionary learning model is:

$$\min_{D,x}\left\|\tilde{d}-Dx\right\|^2 \text{ s.t. } \|x\|_0 \leq T,$$

where dictionary D and sparse coefficients x are resulted by a sparse linear decomposition of demigrated data $\tilde{d}$, and T is a sparsity threshold.

16. The process of claim 15, wherein the dictionary (D) is used to guide attenuating noise on the raw data (d):

$$\min_{x_1,x_2}\|x_1\|_1 + \alpha\|x_2\|_1 \text{ s.t. } \|d-Dx_1-Sx_2\|^2 \leq \epsilon,$$

where $x_1$ and $x_2$ are the sparse representations of signal and noise, respectively, S is a sparsity basis for noise, $\alpha$ is a tradeoff parameter, and $\epsilon$ is an error tolerance.

17. A process for producing hydrocarbons from a subterranean reservoir comprising:
selecting a subterranean formation for hydrocarbon production;
designing a seismic survey to image the subterranean formation;
acquiring raw data using seismic sources and receivers;
obtaining raw data (d) from a seismic survey;
estimating a stacked image ($\tilde{m}$) with mitigated artifacts;
demigrating the data from the stacked image ($\tilde{m}$) to attain a clean reference;
building a reference from the demigrated data;
solving an unsupervised dictionary learning problem;
solving a dual-domain inversion to leverage sparsity, compressibility or both to guide attenuating noise of the raw data (d);
simultaneously inverting signal and noise to provide an improved signal;
comparing a direct demigration to the improved signal to obtain denoised data with a proper amplitude versus offset; and
constructing a well in said subterranean reservoir to produce hydrocarbons.

18. The process of claim 17, wherein said subterranean reservoir is selected from an oil reservoir, an unconventional reservoir, heavy oil reservoir, gas reservoir, coal-bed-methane reservoir, or a source rock.

19. The process of claim 17, wherein said data has noise selected from harmonics, random noise, guided waves, coherent, and incoherent noise and combinations thereof.

20. The process of claim 17, wherein said stacked image is estimated by $$\tilde{m}=L^TWd,$$

where $L^T$ denotes a migration operator and W applies a filter.

21. The process of claim 17, wherein mitigated artifacts are filtered with an automatic gain control (AGC), or other noise control techniques, and combinations thereof.

22. The process of claim 17, wherein said denoised data is demigrated from the image estimate (m) with a velocity model $$\tilde{d}=L\tilde{m}=LL^TWd,$$

where $\tilde{d}$ share source/receiver locations, kinematics and spectrums as input data d, but with less noise.

23. The process of claim 17, wherein an unsupervised dictionary learning model is:

$$\min_{D,x} \|\tilde{d} - Dx\|^2 \text{ s.t. } \|x\|_0 \leq T,$$

where dictionary D and sparse coefficients x are resulted by a sparse linear decomposition of demigrated data $\tilde{d}$, and T is a sparsity threshold.

24. The process of claim 23, wherein the dictionary (D) is used to guide attenuating noise on the raw data (d):

$$\min_{x_1,x_2} \|x_1\|_1 + \alpha \|x_2\|_1 \text{ s.t. } \|d - Dx_1 - Sx_2\|^2 \leq \epsilon,$$

where $x_1$ and $x_2$ are the sparse representations of signal and noise, respectively, S is a sparsity basis for noise, $\alpha$ is a tradeoff parameter, and $\epsilon$ is an error tolerance.

* * * * *